US012326827B2

(12) United States Patent
Qin et al.

(10) Patent No.: US 12,326,827 B2
(45) Date of Patent: Jun. 10, 2025

(54) METHOD AND APPARATUS FOR OPTIMIZING BUS SIGNAL TIME, AND COMPUTER DEVICE

(71) Applicant: SUZHOU METABRAIN INTELLIGENT TECHNOLOGY CO., LTD., Jiangsu (CN)

(72) Inventors: Yuqian Qin, Jiangsu (CN); Minzheng Tian, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 20 days.

(21) Appl. No.: 18/696,227

(22) PCT Filed: Jun. 29, 2022

(86) PCT No.: PCT/CN2022/102528
§ 371 (c)(1),
(2) Date: Mar. 27, 2024

(87) PCT Pub. No.: WO2023/137983
PCT Pub. Date: Jul. 27, 2023

(65) Prior Publication Data
US 2024/0338333 A1 Oct. 10, 2024

(30) Foreign Application Priority Data
Jan. 23, 2022 (CN) .................. 202210075824.X

(51) Int. Cl.
*G06F 13/42* (2006.01)
(52) U.S. Cl.
CPC .................... *G06F 13/42* (2013.01)
(58) Field of Classification Search
CPC ....................................... G06F 13/42
See application file for complete search history.

(56) References Cited

U.S. PATENT DOCUMENTS

| 10,229,086 B2* | 3/2019 | Barcohen | G06F 9/226 |
| 2013/0304954 A1* | 11/2013 | Decesaris | G06F 9/44 |
| | | | 710/110 |
| 2015/0169488 A1* | 6/2015 | Metzner | G06F 13/4022 |
| | | | 710/316 |

FOREIGN PATENT DOCUMENTS

| CN | 101782885 A | 7/2010 |
| CN | 104239629 A | 12/2014 |

(Continued)

OTHER PUBLICATIONS

Chinese Office Action received for CN Application No. 202210075824.X on Jul. 11, 2023, 3 pgs.

(Continued)

*Primary Examiner* — David E Martinez
(74) *Attorney, Agent, or Firm* — Merchant & Gould P.C.

(57) ABSTRACT

Disclosed are a method and apparatus for optimizing a signal rise time of a bus, and a computer device. The method includes: constructing an equivalent circuit of a bus link on the basis of a topology of the link; calculating an equivalent capacitance of the link and a threshold value of pull-up resistance; calculating a time required for a signal of the link to change from a first threshold value to a second threshold value on the basis of the equivalent circuit, the equivalent capacitance, and the threshold value of the pull-up resistance; and connecting a compensation capacitor in the equivalent circuit and connecting a first transistor in parallel at two ends of the compensation capacitor if the time required for the signal to change from the first threshold value to the second threshold value does not meet regulations of a bus specification, to optimize the signal rise time.

19 Claims, 3 Drawing Sheets

(56) References Cited

FOREIGN PATENT DOCUMENTS

| | | |
|---|---|---|
| CN | 104731742 A | 6/2015 |
| CN | 107704701 A | 2/2018 |
| CN | 107888222 A | 4/2018 |
| CN | 112765064 A | 5/2021 |
| CN | 114443542 A | 5/2022 |

OTHER PUBLICATIONS

International Search Report and Written Opinion received for PCT Application No. PCT/CN2022/102528 on Jan. 23, 2022, 10 pgs.

* cited by examiner

Fig. 1 - PRIOR ART
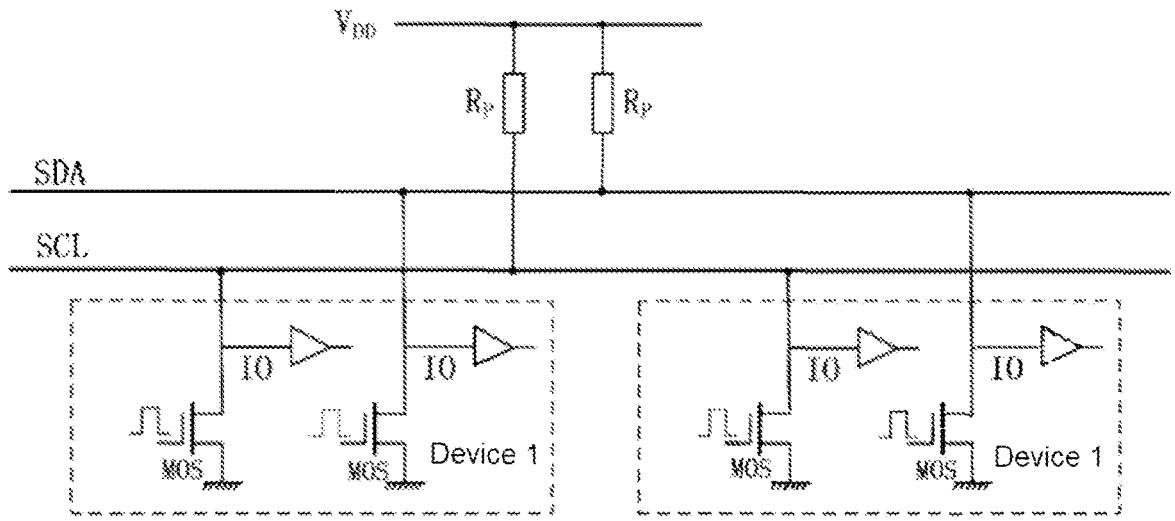
Fig. 2
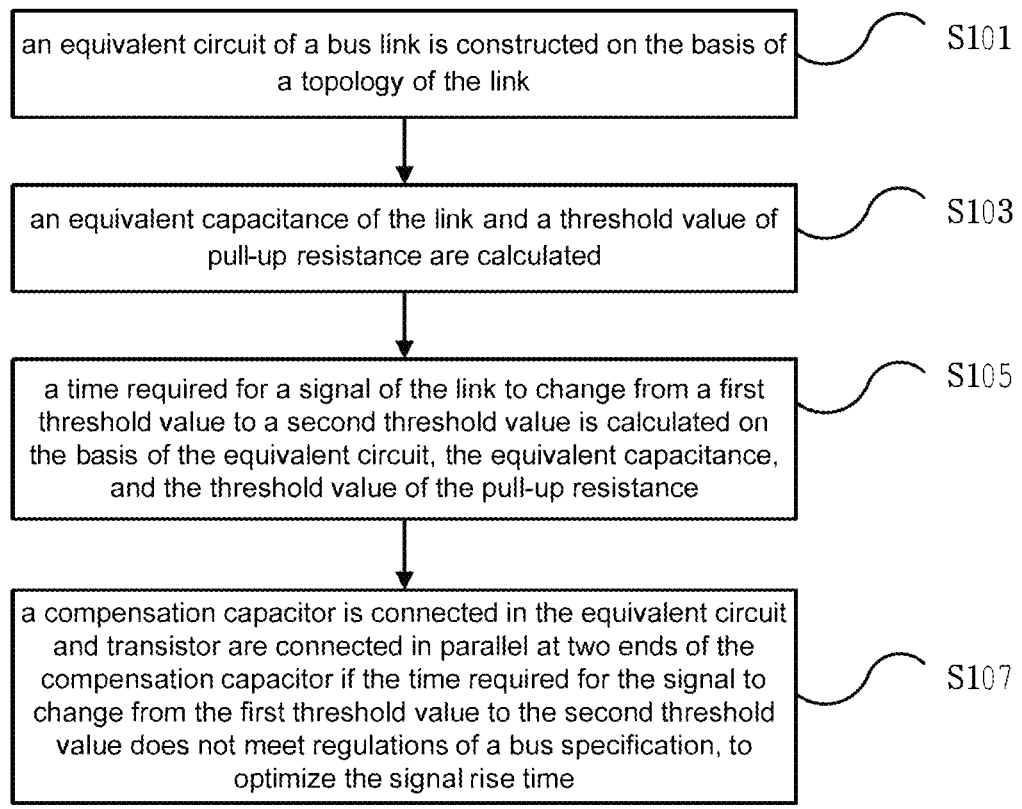

METHOD AND APPARATUS FOR OPTIMIZING BUS SIGNAL TIME, AND COMPUTER DEVICE

CROSS-REFERENCE TO RELATED APPLICATION

The present application is a National Stage Application of PCT International Application No.: PCT/CN2022/102528 filed on Jun. 29, 2022, which claims priority to Chinese Patent Application 202210075824.X, filed in the China National Intellectual Property Administration on Jan. 23, 2022, the disclosure of which is incorporated herein by reference in its entirety.

TECHNICAL FIELD

The present disclosure relates to the technical field of circuits, and in particular, to a method and apparatus for optimizing a signal rise time of a bus, and a computer device.

BACKGROUND

I2C (Inter-Integrated Circuit) is a synchronous serial bus connecting a microcontroller and peripheral devices thereof, is composed of one data line SDA (serial data) and a clock line SCL (serial clock), and is widely applied to various fields due to advantages of a few interface lines, simple control mode and small device packaging.

In a server product, common devices such as a temperature sensor, a Field Replaceable Unit (FRU for short) and a Complex Programmable Logic Device (CPLD for short) all interact with a control chip BMC (Baseboard Management Controller) via an I2C bus. In addition, the I2C bus is also compatible with an SMBUS (System Management Bus) and a Power Management Unit Bus, etc., and the I2C bus may be said to be the most basic and widely used bus protocol in servers, and an optimization design thereof is crucial for improving the management stability and efficiency of a server system.

As shown in FIG. 1, it is a schematic diagram of a link topology of the I2C bus. A connection topology is equivalent to a drain open-circuit structure; and when an MOS (abbreviation of MOSFET (Metal-Oxide-Semiconductor Field-Effect Transistor)) transistor is turned off, SDA/SCL is pulled up to a power source via a resistor, thereby achieving conversion from a low level to a high level. When a device is connected to the I2C bus, a capacitor will be introduced into the link, and the longer the bus link, the more introduced devices, and the larger the capacitance value; therefore, the conversion from a low level to a high level is actually an RC (Resistor-Capacitance circuit) charging process, and the larger the capacitance value of the link, the longer the charging time, and the more delayed a rising edge of an I2C signal.

The inventor has realized that too long wiring and too many loads will lengthen the rising edge of the signal, thereby shortening the establishment time of the signal. If the establishment time cannot meet I2C timing requirement, the stability of data transmission will be directly affected, and even a bit error will be caused; therefore, in order to meet the I2C timing requirement, the signal rise time must be strictly controlled.

SUMMARY

Some embodiments of the present disclosure provide a method and apparatus for optimizing a signal rise time of a bus, and a computer device.

One aspect of embodiments of the present disclosure provides a method for optimizing a signal rise time of a bus, specifically including the following steps:
an equivalent circuit of a bus link is constructed on the basis of a topology of the link;
an equivalent capacitance of the link and a threshold value of pull-up resistance are calculated;
a time required for a signal of the link to change from a first threshold value to a second threshold value is calculated on the basis of the equivalent circuit, the equivalent capacitance, and the threshold value of the pull-up resistance; and
a compensation capacitor is connected in the equivalent circuit and a first transistor are connected in parallel at two ends of the compensation capacitor if the time required for the signal to change from the first threshold value to the second threshold value does not meet regulations of a bus specification, to optimize the signal rise time.

In some embodiments, the equivalent circuit includes a power source, a signal line and a grounding point, wherein a pull-up resistor is connected between the power source and the signal line, a second transistor and an equivalent capacitor are connected between the power source and the grounding point, and the transistor and the equivalent capacitor are connected in parallel.

In some embodiments, the step that the compensation capacitor is connected in the equivalent circuit and the first transistor are connected in parallel at two ends of the compensation capacitor, includes:
the compensation capacitor is connected in series between the equivalent capacitor and the grounding point of the equivalent circuit, and the first transistor are connected in parallel at two ends of the compensation capacitor.

In some embodiments, the step that the time required for the signal of the link to change from the first threshold value to the second threshold value is calculated on the basis of the equivalent circuit, the equivalent capacitance, and the threshold value of the pull-up resistance, includes:
a time formula corresponding to signal change of the link is derived on the basis of the equivalent circuit; and
the time required for the signal of the link to change from the first threshold value to the second threshold value is calculated on the basis of the time formula, the equivalent capacitance, and the threshold value of the pull-up resistance.

In some embodiments, the step that the equivalent capacitance of the link is calculated, includes:
the equivalent capacitance is calculated on the basis of the length of the link and the number of pins of mounted devices in the link.

In some embodiments, the step that the threshold value of the pull-up resistance is calculated, includes:
the threshold value of the pull-up resistance is calculated on the basis of an operating voltage and a maximum operating current of the link.

In some embodiments, the method further includes:
the link is optimized on the basis of the equivalent circuit to which the compensation capacitor and the first transistor are connected.

In some embodiments, the first transistor includes MOS transistor.

Another aspect of embodiments of the present disclosure further provides an apparatus for optimizing a signal rise time of a bus, including:

a construction component, the construction component being configured to construct a topology of a bus link on the basis of an actual situation of the link;

wherein the construction component is further configured to construct an equivalent circuit of the link on the basis of the topology of the link;

a calculation component, the calculation component being configured to calculate an equivalent capacitance of the link and a threshold value of pull-up resistance;

wherein the calculation component is further configured to calculate a time required for a signal of the link to change from a first threshold value to a second threshold value on the basis of the equivalent circuit, the equivalent capacitance, and the threshold value of the pull-up resistance; and a compensation component, the compensation component being configured to connect a compensation capacitor in the equivalent circuit and connect a first transistor in parallel at two ends of the compensation capacitor if the time required for the signal to change from the first threshold value to the second threshold value does not meet regulations of a bus specification, to optimize the signal rise time.

Still another aspect of embodiments of the present disclosure further provides a computer device, including: at least one processor; and a memory, wherein the memory stores a computer program running on the processor, and when the computer program is executed by the processor, the steps of the following method are implemented:

an equivalent circuit of a bus link is constructed on the basis of a topology of the link;

an equivalent capacitance of the link and a threshold value of pull-up resistance are calculated;

a time required for a signal of the link to change from a first threshold value to a second threshold value is calculated on the basis of the equivalent circuit, the equivalent capacitance, and the threshold value of the pull-up resistance;

and a compensation capacitor is connected in the equivalent circuit and a first transistor are connected in parallel at two ends of the compensation capacitor if the time required for the signal to change from the first threshold value to the second threshold value does not meet regulations of a bus specification, to optimize the signal rise time.

In some embodiments, the equivalent circuit includes a power source, a signal line and a grounding point, wherein a pull-up resistor is connected between the power source and the signal line, a second transistor and an equivalent capacitor are connected between the power source and the grounding point, and the transistor and the equivalent capacitor are connected in parallel.

In some embodiments, the step that the compensation capacitor is connected in the equivalent circuit and the first transistor are connected in parallel at two ends of the compensation capacitor, includes:

the compensation capacitor is connected in series between the equivalent capacitor and the grounding point of the equivalent circuit, and the first transistor are connected in parallel at two ends of the compensation capacitor.

In some embodiments, the step that the time required for the signal of the link to change from the first threshold value to the second threshold value is calculated on the basis of the equivalent circuit, the equivalent capacitance, and the threshold value of the pull-up resistance, includes:

a time formula corresponding to signal change of the link is derived on the basis of the equivalent circuit; and the time required for the signal of the link to change from the first threshold value to the second threshold value is calculated on the basis of the time formula, the equivalent capacitance, and the threshold value of the pull-up resistance.

In some embodiments, the step that the equivalent capacitance of the link is calculated, includes:

the equivalent capacitance is calculated on the basis of the length of the link and the number of pins of mounted devices in the link.

In some embodiments, the step that the threshold value of the pull-up resistance is calculated, includes:

the threshold value of the pull-up resistance is calculated on the basis of an operating voltage and a maximum operating current of the link.

In some embodiments, the method further includes:

the link is optimized on the basis of the equivalent circuit to which the compensation capacitor and the first transistor are connected.

In some embodiments, the first transistor includes MOS transistor.

In some embodiments, some embodiments of the present disclosure further provide a computer device, including a memory and one or more processors, wherein the memory stores computer-readable instructions, which when executed by the one or more processors, cause the one or more processors to execute the steps of the method for optimizing a signal rise time of a bus as claimed in any one above.

In some embodiments, some embodiments of the present disclosure further provide one or more non-transitory storage media storing computer-readable instructions, which when executed by one or more processors, cause the one or more processors to execute the steps of the method for optimizing a signal rise time of a bus as claimed in any one above.

Details of one or more embodiments of the present disclosure are proposed in the accompanying drawings and the description below. Other features and advantages of some embodiments of the present disclosure will become apparent from the description, the accompanying drawings and the claims.

BRIEF DESCRIPTION OF THE DRAWINGS

In order to describe the technical solutions in the embodiments of the present disclosure or in the related art more clearly, hereinafter, accompanying drawings requiring to be used for describing the embodiments or the related art are introduced briefly. Apparently, the accompanying drawings in the following description merely relate to some embodiments of the present disclosure, and for a person of ordinary skill in the art, other embodiments can also be derived from these accompanying drawings without involving any inventive effort.

FIG. 1 is a schematic diagram of a link topology of an I2C bus;

FIG. 2 is a block diagram of some embodiments of a method for optimizing a signal rise time of a bus provided in one or more embodiments of the present disclosure;

DETAILED DESCRIPTION OF THE EMBODIMENTS

Figure 3:
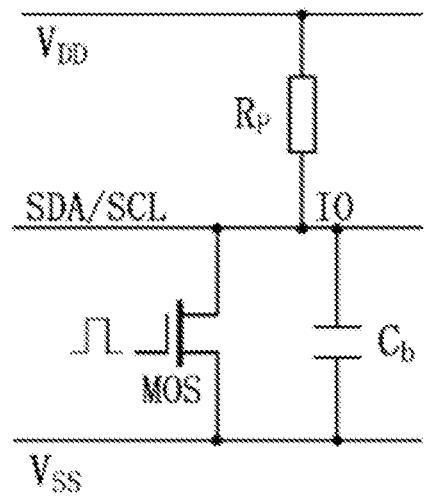
FIG. 3 is a schematic structural diagram of an equivalent circuit based on the link topology of FIG. 1 provided in one or more embodiments of the present disclosure.

In order to make objects, technical solutions and advantages of some embodiments of the present disclosure clearly understood, hereinafter, embodiments of the present disclosure will be further described in detail in conjunction with specific embodiments and with reference to the accompanying drawings.

It should be noted that in the embodiments of the present disclosure, all expressions using "first" and "second" are used to distinguish two different entities having the same name or different parameters. Hence, "first" and "second" are only used for convenience of expression, should not be understood as limitations to embodiments of the present disclosure, and this will not be described one by one in subsequent embodiments.

On the basis of the object, a first aspect of embodiments of the present disclosure provides embodiments of a method for optimizing a signal rise time of a bus. As shown in FIG. 2, the method includes the following steps:

S101, an equivalent circuit of a bus link is constructed on the basis of a topology of the link;

S103, an equivalent capacitance of the link and a threshold value of pull-up resistance are calculated;

S105, a time required for a signal of the link to change from a first threshold value to a second threshold value is calculated on the basis of the equivalent circuit, the equivalent capacitance, and the threshold value of the pull-up resistance; and S107, a compensation capacitor is connected in the equivalent circuit and a first transistor are connected in parallel at two ends of the compensation capacitor if the time required for the signal to change from the first threshold value to the second threshold value does not meet regulations of a bus specification, to optimize the signal rise time.

In some embodiments of the present disclosure, it may be determined that the time required for the signal to change from the first threshold value to the second threshold value does not meet regulations of the bus specification, and on the basis of the determination result, the compensation capacitor is connected in the equivalent circuit and the first transistor are connected in parallel at two ends of the compensation capacitor, to optimize the signal rise time.

In the method for optimizing a signal rise time of a bus provided in embodiments of the present disclosure, by the steps that an equivalent circuit of a bus link is constructed on the basis of a topology of the link; an equivalent capacitance of the link and a threshold value of pull-up resistance are calculated; a time required for a signal of the link to change from a first threshold value to a second threshold value is calculated on the basis of the equivalent circuit, the equivalent capacitance, and the threshold value of the pull-up resistance; and a compensation capacitor is connected in the equivalent circuit and a first transistor are connected in parallel at two ends of the compensation capacitor if the time required for the signal to change from the first threshold value to the second threshold value does not meet regulations of a bus specification, the signal rise time is shortened, a signal establishment time is ensured, and the stability of data transmission is improved.

In some embodiments, the equivalent circuit includes a power source, a signal line and a grounding point, wherein a pull-up resistor is connected between the power source and the signal line, a second transistor and an equivalent capacitor are connected between the power source and the grounding point, and the transistor and the equivalent capacitor are connected in parallel.

In some embodiments, the step that the compensation capacitor is connected in the equivalent circuit and the first transistor are connected in parallel at two ends of the compensation capacitor, includes:

the compensation capacitor is connected in series between the equivalent capacitor and the grounding point of the equivalent circuit, and the first transistor are connected in parallel at two ends of the compensation capacitor.

In some embodiments, the step that the time required for the signal of the link to change from the first threshold value to the second threshold value is calculated on the basis of the equivalent circuit, the equivalent capacitance, and the threshold value of the pull-up resistance, includes:

a time formula corresponding to signal change of the link is derived on the basis of the equivalent circuit; and the time required for the signal of the link to change from the first threshold value to the second threshold value is calculated on the basis of the time formula, the equivalent capacitance, and the threshold value of the pull-up resistance.

In some embodiments, the step that the equivalent capacitance of the link is calculated, includes:

the equivalent capacitance is calculated on the basis of the length of the link and the number of pins of mounted devices in the link.

In some embodiments, the step that the threshold value of the pull-up resistance is calculated, includes:

the threshold value of the pull-up resistance is calculated on the basis of an operating voltage and a maximum operating current of the link.

In some embodiments, the method further includes:

the link is optimized on the basis of the equivalent circuit to which the compensation capacitor and the transistor are connected.

In some embodiments, the first transistor includes MOS transistor.

Hereinafter, specific embodiments of the present disclosure will be illustrated by specific embodiments.

Taking an I2C bus as an example, as shown in FIG. 3, it is an equivalent circuit based on the topology of the I2C bus link as shown in FIG. 1. In FIG. 3, $V_{DD}$ is a power source for providing a voltage to the equivalent circuit, VSS is a ground point, SDA or SCL represents a data signal or a clock signal on a signal line, IO represents an input/output interface, and the equivalent circuit is equivalent to an RC charging circuit; when an MOS transistor is turned off, the $V_{DD}$ (power source) charges a capacitor $C_b$ by a pull-up resistor $R_P$; when the pulse amplitude of the signal changes from a low level to a high level, the MOS transistor is turned on, the capacitor $C_b$ is reversely discharged, and the pulse amplitude of the signal changes from the high level to a low level. Generally, a time for the signal to increase from 10% to 90% of the pulse amplitude is referred to as a rise time. Therefore, as claimed in a capacitor charging mechanism and the equivalent circuit, the following time formula is derived. On the basis of the time formula, it is calculated that the time required for the pulse amplitude value or the voltage of the signal to be charged from 0.1 $V_{DD}$ to 0.9 $V_{DD}$ is:

$$T_r = R_P C_b * \text{Ln}\left(\frac{V_{DD} - 0.1V_{DD}}{V_{DD} - 0.9V_{DD}}\right) \approx 2.2 R_P C_b$$

where Tr represents the time required for the signal to change from a first threshold value to a second threshold value, $R_P$ represents pull-up resistance, $C_b$ represents equivalent capacitance, and $V_{DD}$ represents an operating voltage provided by the power source.

On the basis of this formula, it may be determined that, on the one hand, since the equivalent capacitance $C_b$ is in direct proportion to the length of a bus link and the number of mounted devices, the rise time of the signal may be shortened by reducing the equivalent capacitance $C_b$ of the link; and on the other hand, a method for reducing the resistance value of the pull-up resistor $R_P$ may also be used, and reducing the resistance value may effectively increase the charging current and accelerate the charging process, thereby achieving the purpose of reducing the rise time.

The described methods have the following problems:

1) The method for reducing the equivalent capacitance $C_b$ of the link will limit system design complexity and increase the design difficulty of a PCB. Pins of devices mounted on the bus will all introduce capacitors, and in order to control an equivalent capacitance value of the link, the number of mounted devices on the bus is limited; and the length of a wiring also affects the equivalent capacitance of the link, the longer the wiring, the larger the introduced capacitance, and thus reducing the length of the wiring in a complex layout with a limited space will certainly increase the wiring difficulty of the PCB.

2) The method for reducing the resistance value of the pull-up resistor $R_P$ is not applicable to a link with a very large equivalent capacitance or a link with a very large operating voltage. A maximum current requirement of device pins limits a drive current in the bus; if the drive current is too large, problems such as burnout of a chip will be caused, and therefore there is a lower limit for the resistance value of the pull-up resistor. Therefore, this method is not applicable to a link with a complex topological structure and a very large equivalent capacitance or a link with a very large operating voltage.

Figure 4:
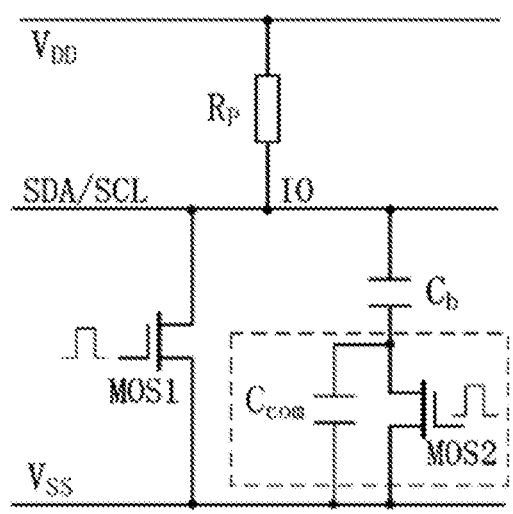
FIG. 4 is a schematic structural diagram of some embodiments of an optimized equivalent circuit provided in one or more embodiments of the present disclosure.

On this basis, in some embodiments of the present disclosure, first, the equivalent capacitance $C_b$ of the link is calculated as claimed in the length of the current link and mounted devices, the lower limit value (threshold value) of the pull-up resistance $R_P$ is calculated as claimed in the operating voltage and the maximum operating current requirement of the link, and the calculated equivalent capacitance $C_b$ and pull-up resistance $R_P$ are substituted into the time formula to obtain a signal rise time of the current link;

it is determined whether the signal rise time meets requirements of a bus specification; if the signal rise time meets the requirements of the bus specification, it indicates that the signal rise time of the current link is good and requires no improvement; and if the signal rise time does not meet the requirements of the bus specification, a compensation capacitor $C_{com}$ is connected in series in the equivalent circuit, and MOS transistor are connected in parallel at two ends of the compensation capacitor, so as to obtain an optimized equivalent circuit as shown in FIG. 4, a circuit structure in which the compensation capacitor is connected in series in the equivalent circuit and the MOS transistor are connected in parallel achieves an optimization effect. By controlling the compensation capacitor, a rising speed of a rising edge and a falling speed of a falling edge of the signal of the link are controlled. It should be noted that, as claimed in requirements of an I2C bus specification, the rise time of an I2C signal needs to be less than 1000 ns in a standard mode, and needs to be less than 300 ns in a fast mode.

As shown in FIG. 4, the same pulse signal needs to be inputted to MOS1 and MOS2, when the pulse signal is at a low level, both MOS1 and MOS2 are turned off; $V_{DD}$ charges a series circuit of $C_b$ and $C_{com}$ by the pull-up resistor $R_P$, and on the basis of the time formula, it is obtained that a time formula after the compensation capacitor is added is:

$$T_r = 2.2 R_P C_{total} = 2.2 R_P \left(\frac{C_b \times C_{com}}{C_b + C_{com}}\right)$$

where $C_{total}$ represents the total capacitance of the optimized equivalent circuit, and $C_{com}$ represents a capacitance of the compensation capacitance.

As the capacitance value of capacitors in series is smaller than the capacitance value of each individual capacitor, the capacitance value of the capacitance $C_{total}$ is smaller than the capacitance value of the equivalent capacitor $C_b$ of the link; the capacitance value of the compensation capacitor $C_{com}$ may be flexibly adjusted, and there is no limitation on adjustment of the pull-up resistor $R_P$, which therefore may be widely applied to links of various complex situations. By the improved equivalent circuit, the problem that the rising edge of the signal is delayed or the rise time is long may be effectively solved.

When the pulse is at a high level, both MOS1 and MOS2 are turned on, at this time, the equivalent capacitor $C_b$ is reversely discharged by MOS1, the compensation capacitor $C_{com}$ is quickly discharged by MOS2, and the signal may be quickly reduced by the compensation capacitor $C_{com}$.

The circuit structure achieving an optimization effect is connected in series to the tail end of a mounted device in the link, to optimize a signal rise time and a signal fall time of the bus link. Compared with controlling the length of the bus link and the number of mounted devices, the method for connecting a compensation capacitor in series and connecting MOS transistor in parallel at two ends of the compensation capacitor is more applicable to a complex system design, does not increase the wiring difficulty of a PCB, also does not need to consider the effect of the maximum operating current of the link, and has no lower limit on the value of the compensation capacitor, and may be applied to a link with a very large equivalent capacitance or a very large operating voltage.

It may be determined from the embodiments above that, in the method for optimizing a signal rise time of a bus provided in embodiments of the present disclosure, by the steps that an equivalent circuit of a bus link is constructed on the basis of a topology of the link; an equivalent capacitance of the link and a threshold value of pull-up resistance are calculated; a time required for a signal of the link to change from a first threshold value to a second threshold value is calculated on the basis of the equivalent circuit, the equivalent capacitance, and the threshold value of the pull-up resistance; and a compensation capacitor is connected in the equivalent circuit and a transistor are connected in parallel at two ends of the compensation capacitor if the time required for the signal to change from the first threshold value to the second threshold value does not meet regulations of a bus specification, the signal rise time and fall time are shortened, a signal establishment time is ensured, and the stability of data transmission is improved.

Figure 5:
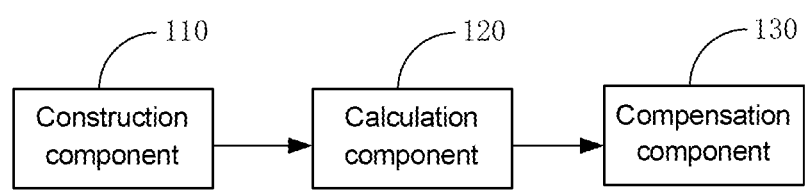
FIG. 5 is a schematic diagram of some embodiments of an apparatus for optimizing a signal rise time of a bus provided in one or more embodiments of the present disclosure.

On the basis of the same inventive concept, as claimed in another aspect of some embodiments of the present disclosure, as shown in FIG. 5, embodiments of the present disclosure further provide an apparatus for optimizing a signal rise time of a bus, including:

a construction component 110, the construction component 110 being configured to construct a topology of a bus link on the basis of an actual situation of the link;

wherein the construction component 110 is further configured to construct an equivalent circuit of the link on the basis of the topology of the link;

a calculation component 120, the calculation component 120 being configured to calculate an equivalent capacitance of the link and a threshold value of pull-up resistance;

wherein the calculation component 120 is further configured to calculate a time required for a signal of the link to change from a first threshold value to a second threshold value on the basis of the equivalent circuit, the equivalent capacitance, and the threshold value of the pull-up resistance;

and a compensation component 130, the compensation component 130 being configured to connect a compensation capacitor in the equivalent circuit and connect a first transistor in parallel at two ends of the compensation capacitor if the time required for the signal to change from the first threshold value to the second threshold value does not meet regulations of a bus specification, to optimize the signal rise time.

In the apparatus for optimizing a signal rise time of a bus provided in embodiments of the present disclosure, by constructing an equivalent circuit of a bus link on the basis of a topology of the link; calculating an equivalent capacitance of the link and a threshold value of pull-up resistance; calculating a time required for a signal of the link to change from a first threshold value to a second threshold value on the basis of the equivalent circuit, the equivalent capacitance, and the threshold value of the pull-up resistance; and connecting a compensation capacitor in the equivalent circuit and connecting a first transistor in parallel at two ends of the compensation capacitor if the time required for the signal to change from the first threshold value to the second threshold value does not meet regulations of a bus specification, the signal rise time and fall time are shortened, a signal establishment time is ensured, and the stability of data transmission is improved.

Figure 6:
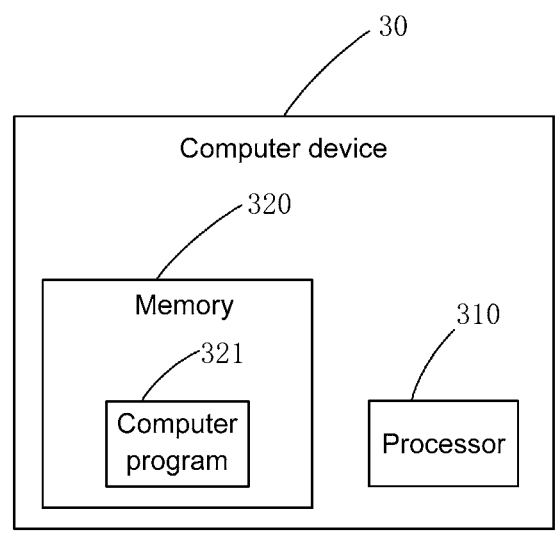
FIG. 6 is a schematic structural diagram of some embodiments of a computer device provided in one or more embodiments of the present disclosure.

On the basis of the same inventive concept, as claimed in another aspect of some embodiments of the present disclosure, as shown in FIG. 6, embodiments of the present disclosure further provide a computer device 30, the computer device 30 including at least one processor 310 and a memory 320; wherein the memory 320 stores computer-readable instructions, which when executed by one or more processors 310, cause the one or more processors 310 to execute steps of the following method:

an equivalent circuit of a bus link is constructed on the basis of a topology of the link;

an equivalent capacitance of the link and a threshold value of pull-up resistance are calculated;

a time required for a signal of the link to change from a first threshold value to a second threshold value is calculated on the basis of the equivalent circuit, the equivalent capacitance, and the threshold value of the pull-up resistance; and a compensation capacitor is connected in the equivalent circuit and a first transistor are connected in parallel at two ends of the compensation capacitor if the time required for the signal to change from the first threshold value to the second threshold value does not meet regulations of a bus specification, to optimize the signal rise time.

In the embodiments of the present disclosure, by the steps that an equivalent circuit of a bus link is constructed on the basis of a topology of the link; an equivalent capacitance of the link and a threshold value of pull-up resistance are calculated; a time required for a signal of the link to change from a first threshold value to a second threshold value is calculated on the basis of the equivalent circuit, the equivalent capacitance, and the threshold value of the pull-up resistance; and a compensation capacitor is connected in the equivalent circuit and a first transistor are connected in parallel at two ends of the compensation capacitor if the time required for the signal to change from the first threshold value to the second threshold value does not meet regulations of a bus specification, the signal rise time and fall time are shortened, a signal establishment time is ensured, and the stability of data transmission is improved.

In some embodiments, the equivalent circuit includes a power source, a signal line and a grounding point, wherein a pull-up resistor is connected between the power source and the signal line, a second transistor and an equivalent capacitor are connected between the power source and the grounding point, and the second transistor and the equivalent capacitor are connected in parallel.

In some embodiments, the step that the compensation capacitor is connected in the equivalent circuit and the first transistor are connected in parallel at two ends of the compensation capacitor, includes:

the compensation capacitor is connected in series between the equivalent capacitor and the grounding point of the equivalent circuit, and the first transistor are connected in parallel at two ends of the compensation capacitor.

In some embodiments, the step that the time required for the signal of the link to change from the first threshold value to the second threshold value is calculated on the basis of the equivalent circuit, the equivalent capacitance, and the threshold value of the pull-up resistance, includes:

a time formula corresponding to signal change of the link is derived on the basis of the equivalent circuit; and the time required for the signal of the link to change from the first threshold value to the second threshold value is calculated on the basis of the time formula, the equivalent capacitance, and the threshold value of the pull-up resistance.

In some embodiments, the step that the equivalent capacitance of the link is calculated, includes:

the equivalent capacitance is calculated on the basis of the length of the link and the number of pins of mounted devices in the link.

In some embodiments, the step that the threshold value of the pull-up resistance is calculated, includes:

the threshold value of the pull-up resistance is calculated on the basis of an operating voltage and a maximum operating current of the link.

In some embodiments, the method further includes:

the link is optimized on the basis of the equivalent circuit to which the compensation capacitor and the first transistor are connected.

In some embodiments, the first transistor includes MOS transistor.

In the present embodiment, the memory, as a non-transitory computer-readable storage medium, may be used to store a non-transitory software program, a non-transitory computer-executable program and components, such as program instructions/components corresponding to the method for optimizing a signal rise time of a bus in the embodiments of the present disclosure. By running the non-transitory software program, instructions and components which are stored in the memory, the processor executes various functional applications of an apparatus and executes data processing, so as to implement the method for optimizing a signal rise time of a bus in the method embodiments as described above.

The memory may include a program storage area and a data storage area, wherein the program storage area may store an operating system and an application program required by at least one function; and the data storage region may store data created as claimed in use of the apparatus, etc. In addition, the memory may include a high-speed random access memory, and may further include a non-transitory memory, for example, at least one magnetic disk storage device, a flash memory device, or other non-transitory solid-state storage devices. In some embodiments, the memory optionally includes a memory that is remotely arranged relative to the processor, and these remote memories may be connected to a local component via a network. Examples of the network include, but are not limited to the Internet, an intranet, a local area network, a mobile communication network and combinations thereof.

Embodiments of the present disclosure further provide one or more non-transitory storage media storing computer-readable instructions. The computer-readable instructions, when executed by one or more processors, enable the one or more processors to execute the method for optimizing a signal rise time of a bus provided in any one of the embodiments above.

Finally, it should be noted that a person of ordinary skill in the art may understand that all or a part of the processes of the methods in the embodiments may be completed by a computer program instructing relevant hardware. A program may be stored in a computer-readable storage medium, and when the program is executed, the processes in the described various method embodiments may be included. A storage medium of the program may be a magnetic disk, an optical disk, a read-only memory (ROM), or a random access memory (RAM), etc. The embodiments of the computer program may achieve the same or similar effects as any method embodiments corresponding thereto.

A person skilled in the art would further understand that various exemplary logical blocks, components, circuits, and algorithm steps described in connection with the disclosure herein may be implemented as electronic hardware, computer software, or a combination of both. To clearly illustrate the interchangeability of hardware and software, general illustration has been made regarding the functions of various illustrative assemblies, blocks, components, circuits and steps. Whether such functions are implemented as software or implemented as hardware depends upon the particular application, and design constraints imposed on the overall system. A person skilled in the art could implement functions in various ways regarding each particular application, but such implementation decisions should not be interpreted as causing a departure from the scope of the disclosure of the embodiments of the present disclosure.

The content above merely relates to exemplary embodiments of the present disclosure, but it should be noted that various changes and modifications could be made without departing from the scope disclosed in the embodiments of the present disclosure as defined in the appended claims. The functions, steps and/or actions of the method claim in accordance with the disclosed embodiments described herein need not be performed in any particular sequence. The serial numbers of the embodiments disclosed in the embodiments of the present disclosure are only for description, and do not represent the preference of the embodiments. In addition, although elements disclosed in the embodiments of the present disclosure may be described or claimed in an individual form, unless explicitly limited to a singular number, it is also understood that there may be multiple elements.

It should be understood that as used herein, the singular form "a (an)" is intended to include plural forms as well, unless the context clearly supports exceptions. It should also be understood that "and/or" as used herein refers to any and all possible combinations including one or more associated items listed.

It should be understood by a person of ordinary skill in the art that the discussion of any embodiment above is merely exemplary, and is not intended to imply that the scope (including the claims) disclosed in embodiments of the present disclosure is limited to these examples. Under the idea of the embodiments of the present disclosure, technical features in the described embodiments or in different embodiments may also be combined, and there are many other variations of different aspects of the embodiments of the present disclosure, but for simplicity, they are not provided in detail. Therefore, any omissions, modifications, equivalent replacements, improvements, etc. made within the spirit and principle of embodiments of the present disclosure shall all fall within the scope of protection of embodiments of the present disclosure.

What is claimed is:

1. A method for optimizing a signal rise time of a bus, comprising:
   constructing an equivalent circuit of a bus link on the basis of a topology of the link, wherein the bus comprises I2C bus, the I2C bus is a bus via which devices in a server product to interact with a control chip being a baseboard management controller;
   calculating an equivalent capacitance of the link and a threshold value of pull-up resistance, wherein calculating the equivalent capacitance of the link, comprises:
   calculating the equivalent capacitance on the basis of the length of the link and the number of pins of mounted devices in the link;
   calculating a time required for a signal of the link to change from a first threshold value to a second threshold value on the basis of the equivalent circuit, the equivalent capacitance, and the threshold value of the pull-up resistance; and
   connecting a compensation capacitor in the equivalent circuit and connecting a first transistor in parallel at two ends of the compensation capacitor on the condition that the time required for the signal to change from the first threshold value to the second threshold value does not meet regulations of a bus specification, to optimize the signal rise time, wherein the regulations of the bus specification comprises I2C timing requirement, the optimized signal rise time makes establishment time of the signal of the link meet the I2C timing requirement.

2. The method as claimed in claim 1, wherein the equivalent circuit comprises a power source, a signal line and a grounding point, wherein a pull-up resistor is connected between the power source and the signal line, a second transistor and an equivalent capacitor are connected between the power source and the grounding point, and the transistor and the equivalent capacitor are connected in parallel.

3. The method as claimed in claim 2, wherein connecting the compensation capacitor in the equivalent circuit and connecting the first transistor in parallel at the two ends of the compensation capacitor, comprises:
   connecting the compensation capacitor in series between the equivalent capacitor and the grounding point of the equivalent circuit, and connecting the first transistor in parallel at two ends of the compensation capacitor.

4. The method as claimed in claim 2, wherein connecting the compensation capacitor in the equivalent circuit and connecting the first transistor in parallel at the two ends of the compensation capacitor, comprises:
   connecting the compensation capacitor in series between the equivalent capacitor and the grounding point of the equivalent circuit, and connecting the first transistor in parallel at two ends of the compensation capacitor, to acquire an optimized equivalent circuit.

5. The method as claimed in claim 4, wherein the method further comprises:
   connecting the optimized equivalent circuit in series to a tail end of a mounted device in the link, to optimize the signal rise time and a signal fall time of the link.

6. The method as claimed in claim 4, wherein calculating the time required for the signal of the link to the change from the first threshold value to the second threshold value on the basis of the equivalent circuit, the equivalent capacitance, and the threshold value of the pull-up resistance comprises:
   calculating the time required for the signal to the change from the first threshold value to the second threshold value on the basis of the following formula:

$$T_r = R_P C_b * \text{Ln}\left(\frac{V_{DD} - 0.1 V_{DD}}{V_{DD} - 0.9 V_{DD}}\right) \approx 2.2 R_P C_b,$$

wherein, Tr represents the time required for the signal to change from the first threshold value to the second threshold value, $R_P$ represents the pull-up resistance, $C_b$ represents the equivalent capacitance, and $V_{DD}$ represents an operating voltage provided by the power source.

7. The method as claimed in claim 6, wherein a same pulse signal is inputted to the first transistor and the second transistor, in a case that the same pulse signal is at a low level, both the first transistor and the second transistor are turned off, and the operating voltage charges a series circuit of the equivalent capacitance and a capacitance of the compensation capacitor by the pull-up resistor.

8. The method as claimed in claim 7, wherein a time formula after the compensation capacitor is added into the equivalent circuit is:

$$T_r = 2.2 R_P C_{total} = 2.2 R_P \left(\frac{C_b \times C_{com}}{C_b + C_{com}}\right),$$

wherein, $C_{total}$ represents a total capacitance of the optimized equivalent circuit, and $C_{com}$ represents the capacitance of the compensation capacitor.

9. The method as claimed in claim 1, wherein calculating the time required for the signal of the link to change from the first threshold value to the second threshold value on the basis of the equivalent circuit, the equivalent capacitance, and the threshold value of the pull-up resistance, comprises:
   deriving a time formula corresponding to signal change of the link on the basis of the equivalent circuit; and
   calculating the time required for the signal of the link to change from the first threshold value to the second threshold value on the basis of the time formula, the equivalent capacitance, and the threshold value of the pull-up resistance.

10. The method as claimed in claim 1, wherein calculating the threshold value of the pull-up resistance, comprises:
    calculating the threshold value of the pull-up resistance on the basis of an operating voltage and a maximum operating current of the link.

11. The method as claimed in claim 1, wherein the method further comprises:
    optimizing the link on the basis of the equivalent circuit to which the compensation capacitor and the first transistor are connected.

12. The method as claimed in claim 1, wherein the first transistor comprises MOS transistor.

13. A computer device, comprising:
    a memory and one or more processors, wherein the memory stores computer-readable instructions, which when executed by the one or more processors, cause the one or more processors to execute a method for optimizing a signal rise time of a bus, the method comprising:
    constructing an equivalent circuit of a bus link on the basis of a topology of the link, wherein the bus comprises I2C bus, the I2C bus is a bus via which devices in a server product to interact with a control chip being a baseboard management controller;
    calculating an equivalent capacitance of the link and a threshold value of pull-up resistance, wherein calculating the equivalent capacitance of the link, comprises:
    calculating the equivalent capacitance on the basis of the length of the link and the number of pins of mounted devices in the link;
    calculating a time required for a signal of the link to change from a first threshold value to a second threshold value on the basis of the equivalent circuit, the equivalent capacitance, and the threshold value of the pull-up resistance; and
    connecting a compensation capacitor in the equivalent circuit and connecting a first transistor in parallel at two ends of the compensation capacitor on the condition that the time required for the signal to change from the first threshold value to the second threshold value does not meet regulations of a bus specification, to optimize the signal rise time, wherein the regulations of the bus specification comprises I2C timing requirement, the optimized signal rise time makes establishment time of the signal of the link meet the I2C timing requirement.

14. The computer device as claimed in claim 13, wherein the equivalent circuit comprises a power source, a signal line and a grounding point, wherein a pull-up resistor is connected between the power source and the signal line, a second transistor and an equivalent capacitor are connected between the power source and the grounding point, and the transistor and the equivalent capacitor are connected in parallel.

15. The computer device as claimed in claim 14, wherein, connecting the compensation capacitor in the equivalent circuit and connecting the first transistor in parallel at the two ends of the compensation capacitor, comprises:

connecting the compensation capacitor in series between the equivalent capacitor and the grounding point of the equivalent circuit, and connecting the first transistor in parallel at two ends of the compensation capacitor, to acquire a optimized equivalent circuit.

16. The computer device as claimed in claim 15, wherein, the one or more processors are further enabled to:
optimizing the link on the basis of the equivalent circuit to which the compensation capacitor and the first transistor are connected.

17. The computer device as claimed in claim 16, wherein, optimizing the link on the basis of the equivalent circuit to which the compensation capacitor and the first transistor are connected, comprises:
connect the optimized equivalent circuit in series to a tail end of a mounted device in the link, to optimize the signal rise time and a signal fall time of the link.

18. The computer device as claimed in claim 15, wherein the optimized equivalent circuit comprises the compensation capacitor, the first transistor, the power source, the signal line, the grounding point, the pull-up resistor, the second transistor, and the equivalent capacitor, wherein the pull-up resistor is connected between the power source and the signal line, the second transistor and the equivalent capacitor are connected between the power source and the grounding point, and the transistor and the equivalent capacitor are connected in parallel, the compensation capacitor is connected in series between the equivalent capacitor and the grounding point of the equivalent circuit, and the first transistor is connected in parallel at two ends of the compensation capacitor.

19. One or more non-transitory computer-readable storage media storing computer-readable instructions, which when executed by one or more processors, cause the one or more processors execute a method for optimizing a signal rise time of a bus, the method comprising:
constructing an equivalent circuit of a bus link on the basis of a topology of the link, wherein the bus comprises I2C bus, the I2C bus is a bus via which devices in a server product to interact with a control chip being a baseboard management controller;
calculating an equivalent capacitance of the link and a threshold value of pull-up resistance, wherein calculating the equivalent capacitance of the link, comprises:
calculating the equivalent capacitance on the basis of the length of the link and the number of pins of mounted devices in the link;
calculating a time required for a signal of the link to change from a first threshold value to a second threshold value on the basis of the equivalent circuit, the equivalent capacitance, and the threshold value of the pull-up resistance; and
connecting a compensation capacitor in the equivalent circuit and connecting a first transistor in parallel at two ends of the compensation capacitor on the condition that the time required for the signal to change from the first threshold value to the second threshold value does not meet regulations of a bus specification, to optimize the signal rise time, wherein the regulations of the bus specification comprises I2C timing requirement, the optimized signal rise time makes establishment time of the signal of the link meet the I2C timing requirement.

* * * * *